US012560549B2

(12) United States Patent
Poroo, Jr. et al.

(10) Patent No.: US 12,560,549 B2
(45) Date of Patent: Feb. 24, 2026

(54) SYSTEMS AND METHODS FOR ROPE EVALUATION

(71) Applicant: Scope Computer Vision Technologies Corp, Sugar Land, TX (US)

(72) Inventors: Jacob Michael Kurtz Poroo, Jr., Sugar Land, TX (US); Samuel Justin McCoy, Sugar Land, TX (US)

(73) Assignee: Scope Computer Vision Technologies Corp, Sugar Land, TX (US)

( * ) Notice: Subject to any disclaimer, the term of this patent is extended or adjusted under 35 U.S.C. 154(b) by 347 days.

(21) Appl. No.: 18/093,214

(22) Filed: Jan. 4, 2023

(65) Prior Publication Data

US 2023/0144387 A1 May 11, 2023

Related U.S. Application Data

(63) Continuation-in-part of application No. PCT/US2021/050761, filed on Sep. 16, 2021.

(60) Provisional application No. 63/079,185, filed on Sep. 16, 2020.

(51) Int. Cl.
*G01N 21/88* (2006.01)
*G01N 21/952* (2006.01)
*G06T 7/00* (2017.01)

(52) U.S. Cl.
CPC ....... *G01N 21/8851* (2013.01); *G01N 21/952* (2013.01); *G06T 7/0004* (2013.01); *G01N 2021/889* (2013.01); *G06T 2207/10016* (2013.01); *G06T 2207/20081* (2013.01); *G06T 2207/20084* (2013.01)

(58) Field of Classification Search
CPC ............. G01N 21/8851; G01N 21/952; G01N 2021/889; G06T 7/0004; G06T 2207/10016; G06T 2207/20081; G06T 2207/20084
USPC ........................................................ 382/159
See application file for complete search history.

(56) References Cited

PUBLICATIONS

Zhou, Ping, et al. "Health monitoring for balancing tail ropes of a hoisting system using a convolutional neural network." Applied Sciences 8.8 (2018): 1346. (Year: 2018).*
Kaur, Dalvir, et al. "Characterization of LF and LMA signal of Wire Rope Tester." International Journal of Advanced Research in Computer Science 8.5 (2017). (Year: 2017).*
(Continued)

*Primary Examiner* — Jonathan S Lee
(74) *Attorney, Agent, or Firm* — Polsinelli PC; Gregory P. Durbin

(57) ABSTRACT

In an embodiment of the disclosed principles, a method of analyzing a rope to estimate its residual break strength (RBS) is provided. The method entails training a multi-layered neural network to recognize rope damage and estimate an RBS for a rope under study by collecting high-resolution visual data of a plurality of sample ropes, extracting visual features of damaged areas of each rope, resolving each visual feature into a damage type and clustering damage type exemplars, breaking each sample rope to determine an actual RBS for each rope and classifying the visual data via determined RBS, specific to product type/ damage mode. Job and product data are entered for the rope under study, the rope is paid out, and high-resolution visual data is captured while spooling back the rope. The correlated data is provided to the multi-layered neural network to generate an estimate of RBS for the rope under study.

12 Claims, 12 Drawing Sheets

(56)            References Cited

PUBLICATIONS

Huang, Xinyuan, et al. "Surface damage detection for steel wire ropes using deep learning and computer vision techniques." Measurement 161 (2020): 107843. (Year: 2020).*

Zhou, Ping, et al. "A novel texture-based damage detection method for wire ropes." Measurement 148 (2019): 106954. (Year: 2019).*

Zhou, Ping, et al. "A hybrid data-driven method for wire rope surface defect detection." IEEE Sensors Journal 20.15 (2020): 8297-8306. (Year: 2020).*

* cited by examiner

Product and Damage Mode-
Specific Visual Index

Contamination: .001424
Discoloration: .00324
Multi-Cut: 0.03914
Incon. Diam./Kinks: 0.00378
Uniform Abr.: 0.24524
Compression: 0.0544

SYSTEMS AND METHODS FOR ROPE EVALUATION

TECHNICAL FIELD

The present disclosure is related generally to industrial rope and cable ("ropes" herein) and, more particularly, in an embodiment of the described principles, to a system and method for predicting a residual break strength (RBS) of a rope.

BACKGROUND

Ropes are used in multiple industries, including the maritime industry and utility industries, in various capacities to, for example, tow vessels, hold and secure vessels while they are docked and/or move and secure cargo. Through normal use, ropes may be repeatedly exposed to high stresses, in a variety of environmental, physical and chemical scenarios. These factors tend to degrade the rope over time, causing eventual failure. A damaged rope may have an RBS that is only a fraction of its original rated RBS, leading it become unsafe for further use.

Given the potential dangers that a failure during use can pose, it is known to periodically inspect such ropes for damage. Identification of damage traditionally involves a manual visual inspection of a rope; one or more workers visually observe a rope in an attempt to identify sections of the rope that may be damaged, and to quantify the extent of that damage. This manual inspection of rope is labor intensive and often results in levels of unpredictability, as each individual's interpretation of what constitutes damage is unavoidably subjective. As such, dangerously damaged rope may not be correctly identified, raising the risk of an accident, while a rope with very little damage may be discarded, wasting resources. A repeatable, reliable inspection method is needed given the types and extent of damage that a rope may experience.

Before proceeding, however, it should be appreciated that while the present disclosure is directed to a system that may address some of the shortcomings listed or implicit in this Background section, any such benefit is neither a limitation on the scope of the disclosed principles, nor of the attached claims, except to the extent expressly noted in the claims.

Additionally, the discussion of technology in this Background section is reflective of the inventors' own observations, considerations, and thoughts, and is in no way intended to accurately catalog or comprehensively summarize any prior art reference or practice. As such, the inventors expressly disclaim this section as admitted or assumed prior art. Moreover, the identification herein of one or more desirable courses of action reflects the inventors' own observations and ideas, and should not be assumed to indicate an art-recognized desirability.

SUMMARY

In an embodiment of the disclosed principles, a method of analyzing a rope to estimate its residual break strength (RBS) is provided. In overview, the method entails training a multi-layered neural network to recognize rope damage and estimate an RBS for a rope under study by collecting high-resolution visual data of a plurality of sample ropes, extracting visual features of damaged areas of each rope, resolving each visual feature into a damage type and clustering damage type exemplars, breaking each sample rope to determine an actual RBS for each rope and classifying the visual data via determined RBS, specific to product type/ damage mode. Job and product data are then entered for the rope under study. As the rope is paid out, high-resolution visual data and sensor data is captured while spooling the rope back in. The correlated data is provided to the multi-layered neural network to generate an estimate of RBS for the rope under study.

Other features and aspects of the disclosed principles will be apparent from the detailed description taken in conjunction with the included figures, of which:

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
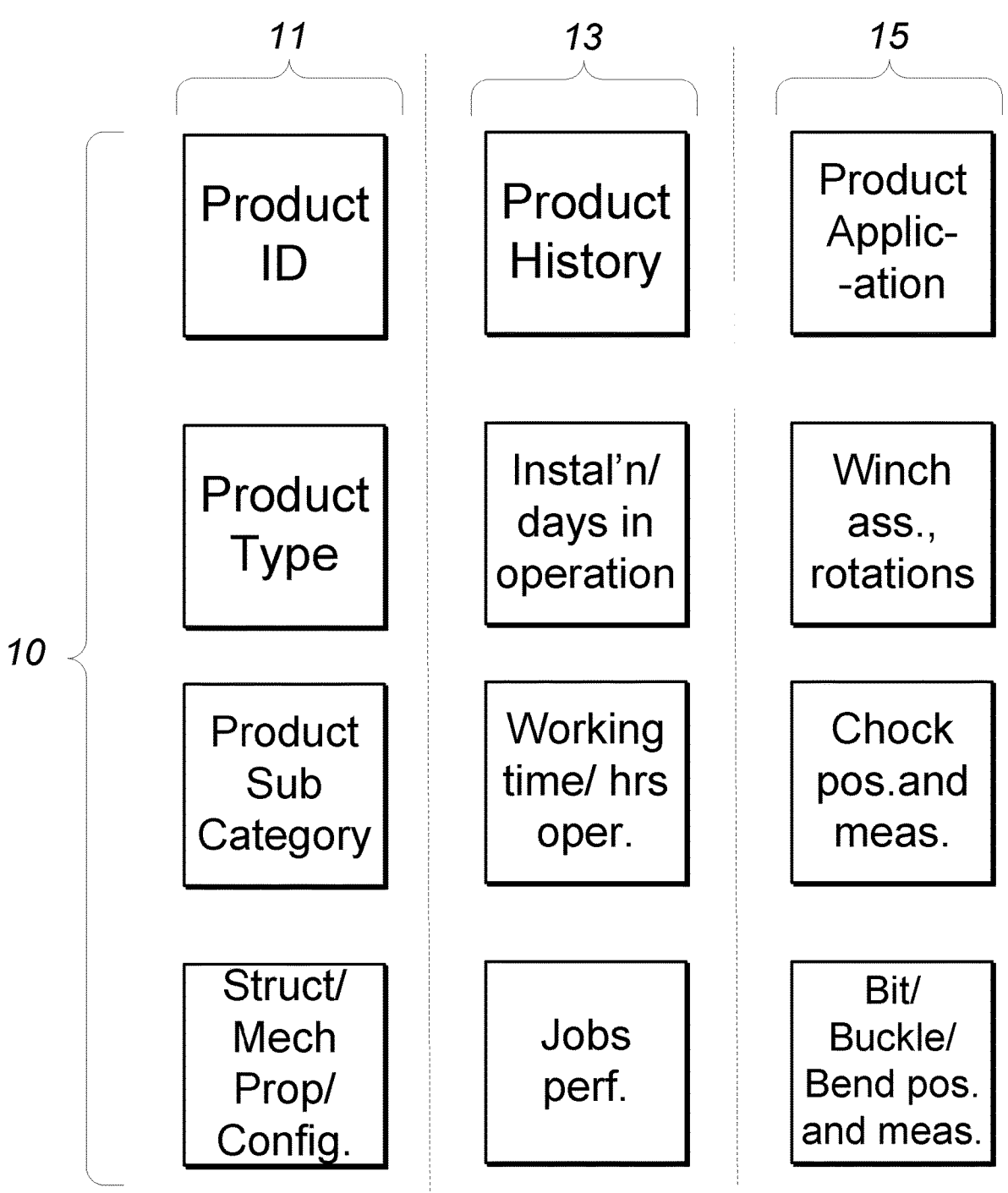
FIG. 1 shows user and vessel onboarding process data in accordance with an embodiment of the disclosed principles.

As noted above, ropes used in industry may be repeatedly exposed to high stresses under a variety of conditions, potentially damaging the rope over time, and thereby reducing its RBS to a fraction of its original rated RBS. Given the potential dangers that a failure of a rope during use can pose, current manual visual inspection technique is both insufficient and inefficient.

With respect to the system and methods described herein, damage exemplars are acquired via the identification of used field samples that exhibit damage mode characteristics, or by simulating damage modes on a new sample product. When simulating, a custom simulation test is used to replicate damage and do controlled testing in order to determine the exact cycle count that reduces the product to 50% (of rated) residual break strength (RBS) consistently. RBS denotes the amount of tension that is required to break the rope. It will be appreciated that alternative thresholds for RBS may be used, and that such alternatives may be greater than or less than the example provided above.

The resulting data is a gradient of failure. A brand new rope has 100% residual break strength and the bottom of the scale used herein is 50% residual break strength. The amount of damage that occurs between 100% and 50% is referred to herein as a gradient of damage, in that the damage is aggregating gradually over time or cycles. However, a gradient does not apply with respect to abrupt damage modes such as cut strands or shock loading. Abrupt damage modes are detected by comparing the state of physical properties present in the product and the deviation of these states from the state of the same physical properties in an unused product.

For reference data set acquisition, a particular damage more is replicated with a new sample for each chosen step between 50% and 100% residual break strength in order to capture data across the entire gradient of failure. In this way, the system has a controlled reference sample for each step of the failure gradient. This can be applied to any damage mode that occurs over time, e.g., abrasion, controlled bend over sheave, UV exposure, contamination, linear damage, etc.

Once simulated samples have been generated across the entire gradient of failure at the chosen step size, the system captures high resolution data on the samples. The high resolution data may include, for example, video data, infrared image data, thermal image data, laser image data, X-Ray/CT scan data, acoustic data, pixel-based images, etc. To ensure the usefulness and consistency of the high resolution data image related aspects such as perspective, lighting, throughput, and environment are controlled during gathering.

With the high resolution data obtained, the samples are then broken in order to determine the RBS of each sample, which can be related to the amount and type of damage that exists with each sample. The high-resolution data and the RBS are then used to extract keystone data from the break location of each sample and the keystone data is keyed to the RBS of that specific sample. This data is then manicured and prepared (refinements to caustics, blurs, contrast, saturation, hue, etc.) and finally classified by the related RBS of each sample.

This keystone data is then provided to a Multi-layered Neural Network with Machine Learning capabilities which then extracts numerous identifying features that are specific to each sample's level of damage and RBS. These features are then transformed into multi-dimensional quantitative representations and clustered by similarity using data analytics (cluster analysis, k-means clustering, linear regression analysis, and/or other statistical analysis and machine learning techniques) into an index/directory specific to each sample's data.

This enables a computer system running a copy of the software to automatically identify features and clusters of features and relate those features to an approximate RBS when presented with data from a sample product. The identification and resolution to an RBS can then be automatically entered into an inspection report that is made available to users in real-time through an on-premise computer and/or an internet application.

Further, the system can then compare new sample data to previous sample data with similar features that have known RBS outcomes and prompt users to further inspect, repair or replace products in real-time. This also applies to captured data that exhibits a trending damage mode from the same area of the same rope when compared to previous scans. A Visual Index, which will be discussed in greater detail herein, is one of the primary indexes that supports an overall Line Health Index that is predicted for each scanned sample.

Also for purposes of comparison data acquisition, clients may provide a number of products for RBS testing once they reach a certain level of wear. These samples are then broken to determine the RBS specific to that product, and then the multi-layered neural networks are further trained to increase accuracy. Once the networks have been refined in this way, the software is updated so that the increased accuracy can be pushed to on-premise computer systems, e.g., at industrial sites that employ the ropes in question.

The system includes a deployed portion in the field, including one or more visual inspection devices that collect the high resolution data feed. These on site visual inspection devices transmit their individual data streams to the on-site computer running local instances of the networks and software. At the outset of deployment, or after a rope replacement, the client enters key data about the vessel and product to be inspected (e.g., product ID, construction, application, configuration, etc.). Sensors are applied to the winch system and in the operational environment which constantly monitor the product's usage (frequency of use, hours of operation, tension, temperature, exposure, motion sensing, etc.).

Prior to inspection, the user may submit other data regarding the product (job ID information, crew information, line rotation, etc.). This can be done on an ongoing basis. Each of these data groups are tracked and scored over the life of each line. The unique scores that have accumulated for each of the returned products form the remainder of indexes/directories that collectively make up the Line Health Index include the following:

Temperature Index-product and environment-thermal imaging/IR imaging, air/ambient temperature, water temperature, steady-state temperature, minimum/maximum/mean/median and deviation.

Operating Index-motion-sensing/timestamps-days in operation, hours of operation, jobs performed, winch assignment, winch rotations, end-for-ending, chick positions, bend positions, job ID, job category, etc.

Tension Index-on-winch sensor, motion-sensing, timestamps-time under tension, frequency of tension, magnitude of tension per use, minimum/maximum/mean/median and deviation.

Product Index-product ID, product type, product category, linear density diameter/measurements, minimum break load, construction, coating, materials, etc.

Visual Index—to be described in greater detail below.

When a scan is initiated and the product travels past or through the visual inspection device, high resolution data of the product is captured. This data is transmitted to the on-premise computer running a local instance of the analysis software system. As this occurs, the system recognizes visual features in the high resolution data of the product, and relates those features to visual indices from the network training that exhibit similar features. A prediction based on the visual index is then automatically correlated to the existing scores based on temperature, operating, tension and product indices that have been recorded for that specific product.

The non-visual indexes have been accumulated over time, and have been directly tied to RBSs from returned used products. All five indexes are then automatically compared to historical scores for similarity (occurrence, deviation, frequency, repetition, similarity, time, date, location, trends, highest/lowest, mean, median, and/if/or/then). This augmentation of the visual index prediction and correlation to the historical known outcomes results in a final prediction for the inspected product. The final prediction is referred to herein as the Line Health Index. This process is executed in real-time as the rope is passing through the device.

The Line Health Index predictions are then aggregated, organized and presented to the user via a user interface with automated dashboards so that the user can intuitively browse through current and historical Line Health Index predictions that are specific to their daily operations. These dashboards may be customizable to individual user preferences so that they can make data-driven decisions to better mitigate the risk associated with using the inspected products. Based on these dashboards, predictive maintenance and remediation can be implemented as products begin to show trends towards failure modes. Custom reports and notifications can be created to alert users when certain indices meet specific thresholds that are critical to their unique operations.

This on-premise system may be equipped to wirelessly communicate with the provider cloud network. Once a client computer reaches an area with WiFi or other communications capabilities, it will sync with the provider cloud network. Once synced, the on-premise computer will update the historical Line Health Indexes specific to that product that exist on the cloud. This enables a distributed team to monitor the Line Health Index (in real-time if connected to the internet). Further, the provider cloud network will then update the on-premise computer system with the latest and most accurate versions of the networks and software so that the latest versions are available to all users as they are released. At the local end, in-app expert consulting, in-app scheduling of repairs and maintenance, and in-app product replacement and recommendations may be provided.

With this overview in mind, we turn now to a more detailed discussion of the disclosed principles in conjunction with the attached figures. Turning to FIG. 1, this figure shows user and vessel onboarding process data in accordance with an embodiment of the disclosed principles. The data 10 entered to onboard a particular product, e.g., a rope serving in a particular application, includes product data 11, product history data 13 and product application data 15.

The product data 11 in the illustrated example includes product type, product sub-category and product structural/mechanical properties/configuration. The product history data 13 includes, in this example, installation date or days in operation, working time or hours of operation and jobs performed. The product application data 15 examples include winch assignments and rotations, chock positions and measurements and bit/buckle bend positions and measurements.

Figure 2:
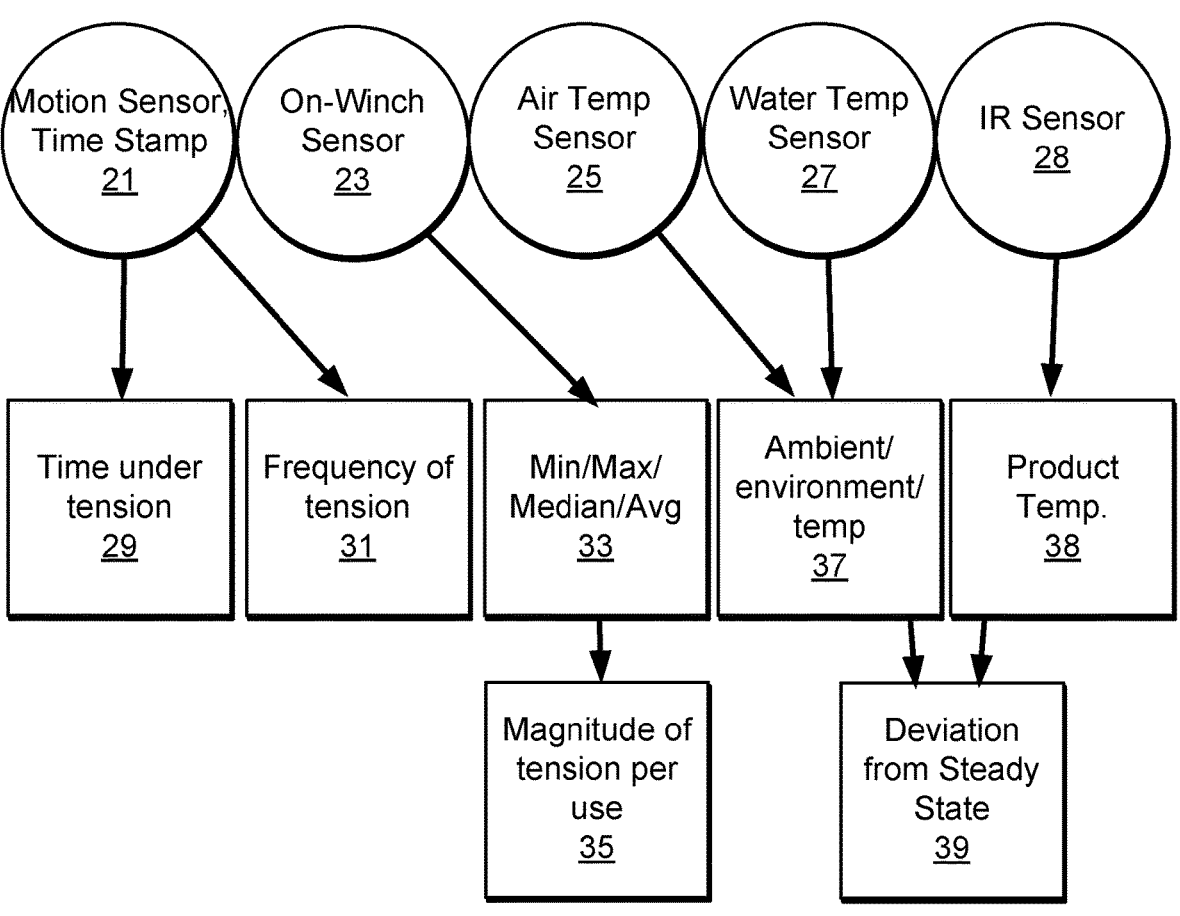
FIG. 2 shows a data flow for automated logging of usage data in accordance with an embodiment of the disclosed principles.

Turning now to FIG. 2, this figure shows a data flow for automated logging of usage data in accordance with an embodiment of the disclosed principles. In the illustrated example, the usage data arises from a number of sensors, including a motion sensor with time stamp 21, an on-winch sensor 23, an air temperature sensor 25, a water temperature sensor 27, and an IR sensor 28 for monitoring product temperature.

The motion sensor with time stamp 21 generates a time under tension 29 and a frequency of tension 31. The on-winch sensor 23 generates a magnitude of tension per use 35 based on usage statistics 33, such as min/max tension and median/average tension. The air temperature sensor 25 and water temperature sensor 27 are used to derive an ambient/environmental temperature 37. The IR sensor 28 is able to generate the product temperature 38. Finally, the ambient/environmental temperature 37 and product temperature 38 are used to generate a deviation from steady state value 39.

Figure 3:
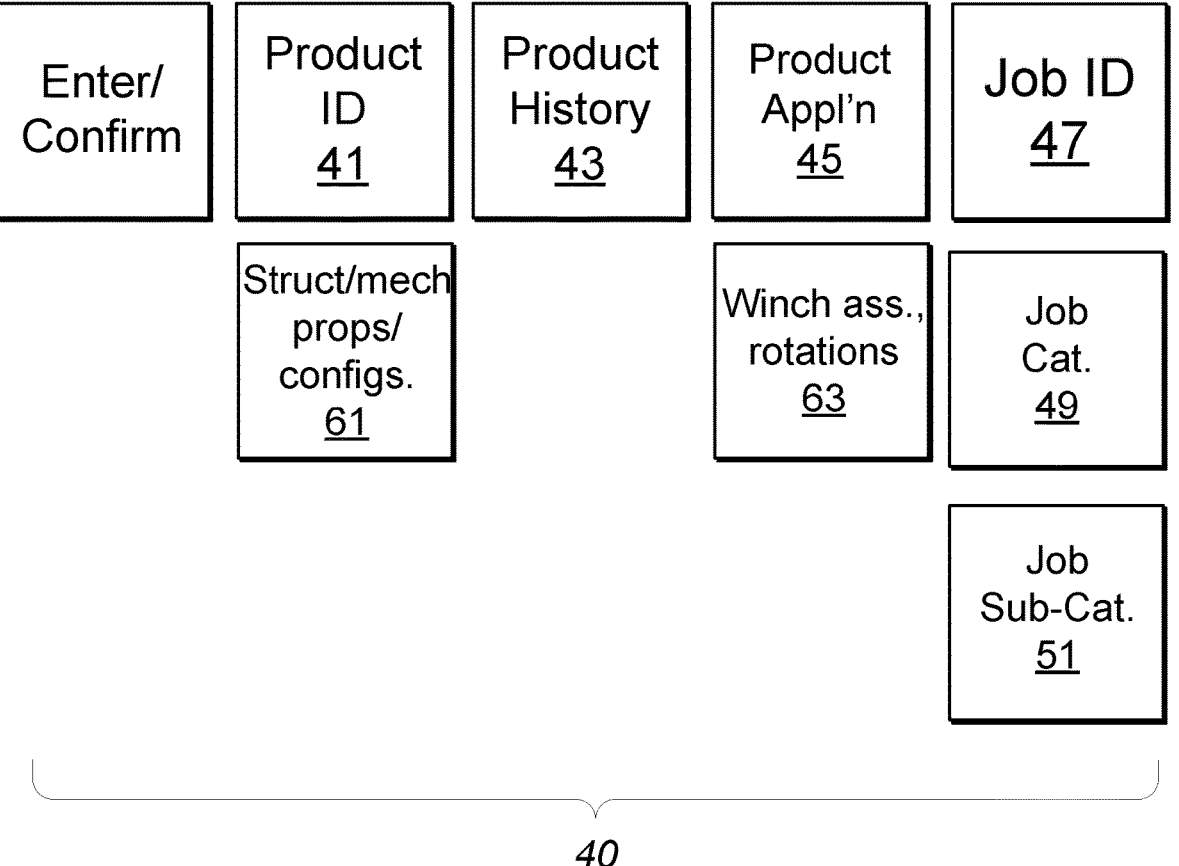
FIG. 3 shows a user interface flow during preparation for scan/inspection in accordance with an embodiment of the disclosed principles.

Turning to FIG. 3, this figure is a user interface flow 40 during preparation for scan/inspection in accordance with an embodiment of the disclosed principles. In the illustrated example, the user confirms the onboarding product and job data, including for example, the product ID 41 (correlating to the mechanical properties of the product), product history 43, product application 45 (correlating to winch assignments and rotations) and job ID 47. As shown previously in the onboarding data entry, the job ID 47 may include, for example, the job category 49 and job sub-category 51.

Figure 4:
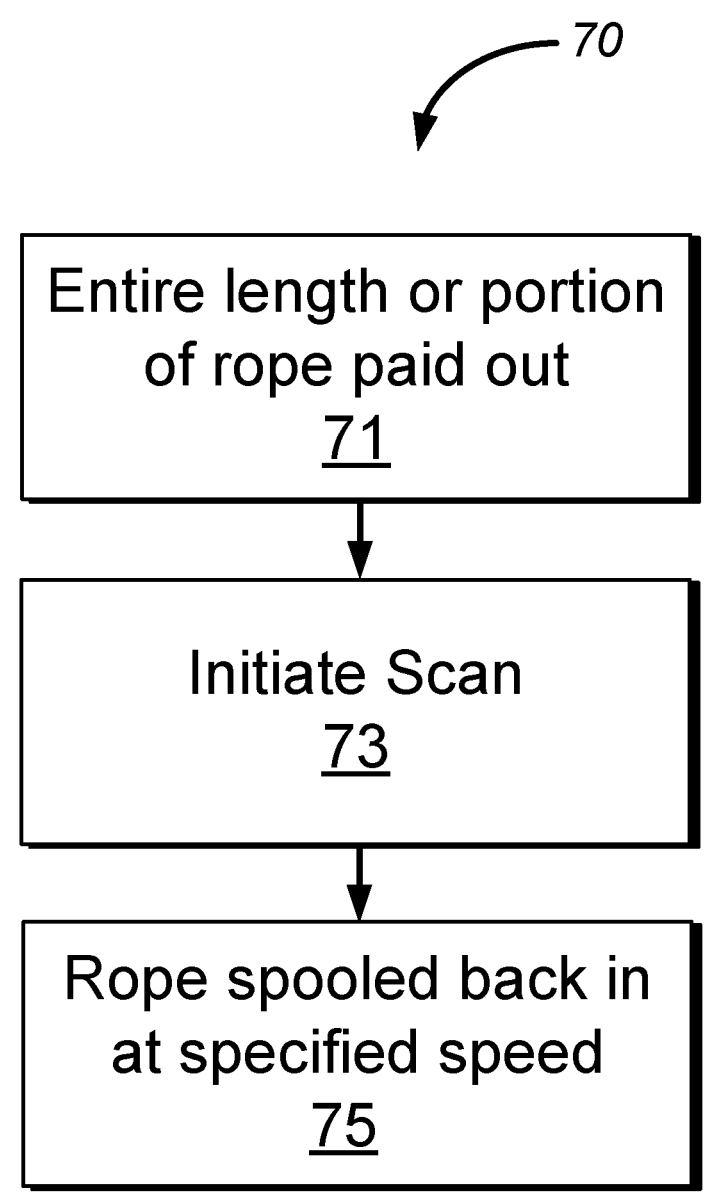
FIG. 4 is a flow chart showing a process of executing a visual scan in accordance with an embodiment of the disclosed principles.

FIG. 4 is a flow chart showing a process 70 of executing a visual scan in accordance with an embodiment of the disclosed principles. Initially at stage 71, the entire length or portion of the rope in question (or the entire length to be analyzed) is paid out. The visual scan by the appropriately located visual sensors is begun at stage 73 and the entire length that has been paid out is spooled back in so that high resolution data may be gathered.

Figure 5:
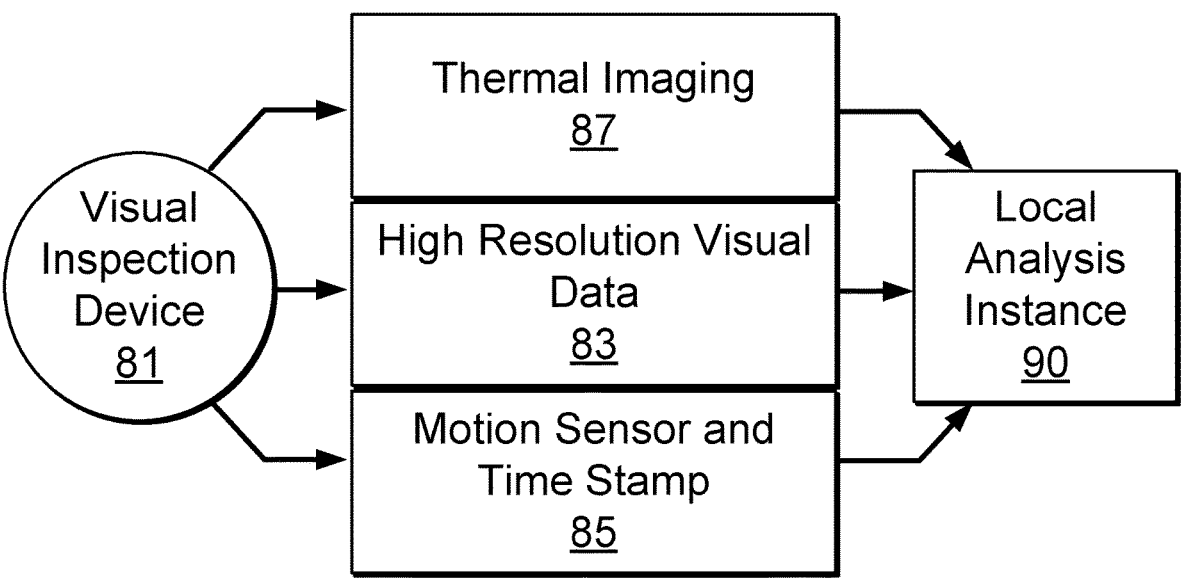
FIG. 5 shows a data flow for a visual scan process in accordance with an embodiment of the disclosed principles.

Turning now to FIG. 5, this figure shows a data flow for a visual scan process in accordance with an embodiment of the disclosed principles. Initially, the visual inspection device 81 acquires a data set including high resolution visual data 83, motion data and time stamp 85 and one or more thermal images 87 as the rope is drawn past the visual inspection device 81. The high resolution visual data 83, motion data and time stamp 85 and one or more thermal images 87 are then fed to a computer running a local instance of the analysis application for further analysis.

Figure 6:
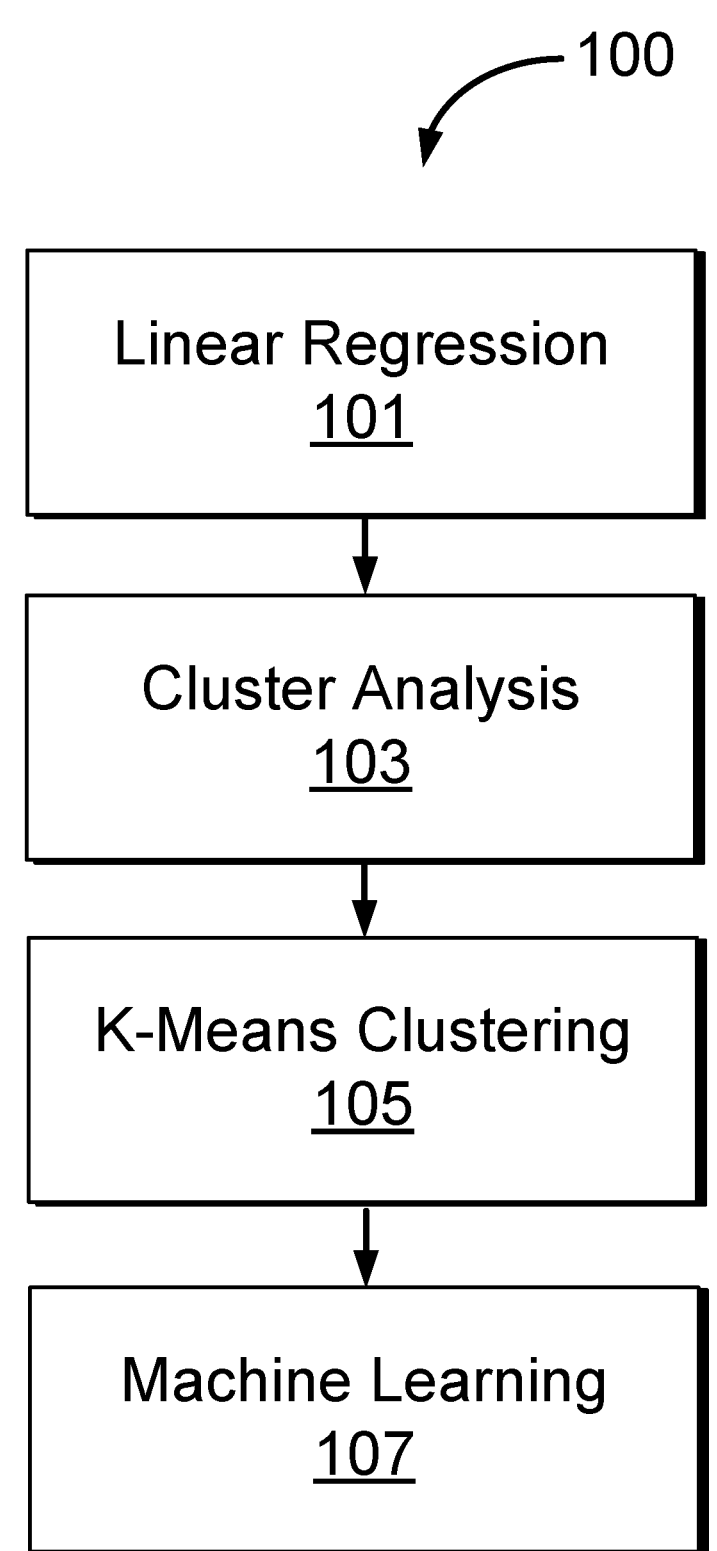
FIG. 6 is a flow chart showing a process of intelligent recognition of visual indices and directories in accordance with an embodiment of the disclosed principles.

That analysis, described above, entails, in part, analyzing the deviation of fibers, yarns and strands from their unused state. As the flow chart of FIG. 6 shows in accordance with an embodiment of the disclosed principles, the process 100 includes linear regression (stage 101), cluster analysis (stage 103), k-means clustering (stage 105) and machine learning (stage 107). It will be appreciated that alternate analyses may replace one or more of those shown. The output of the process 100 is a set of visual indices and directories.

Figure 7:
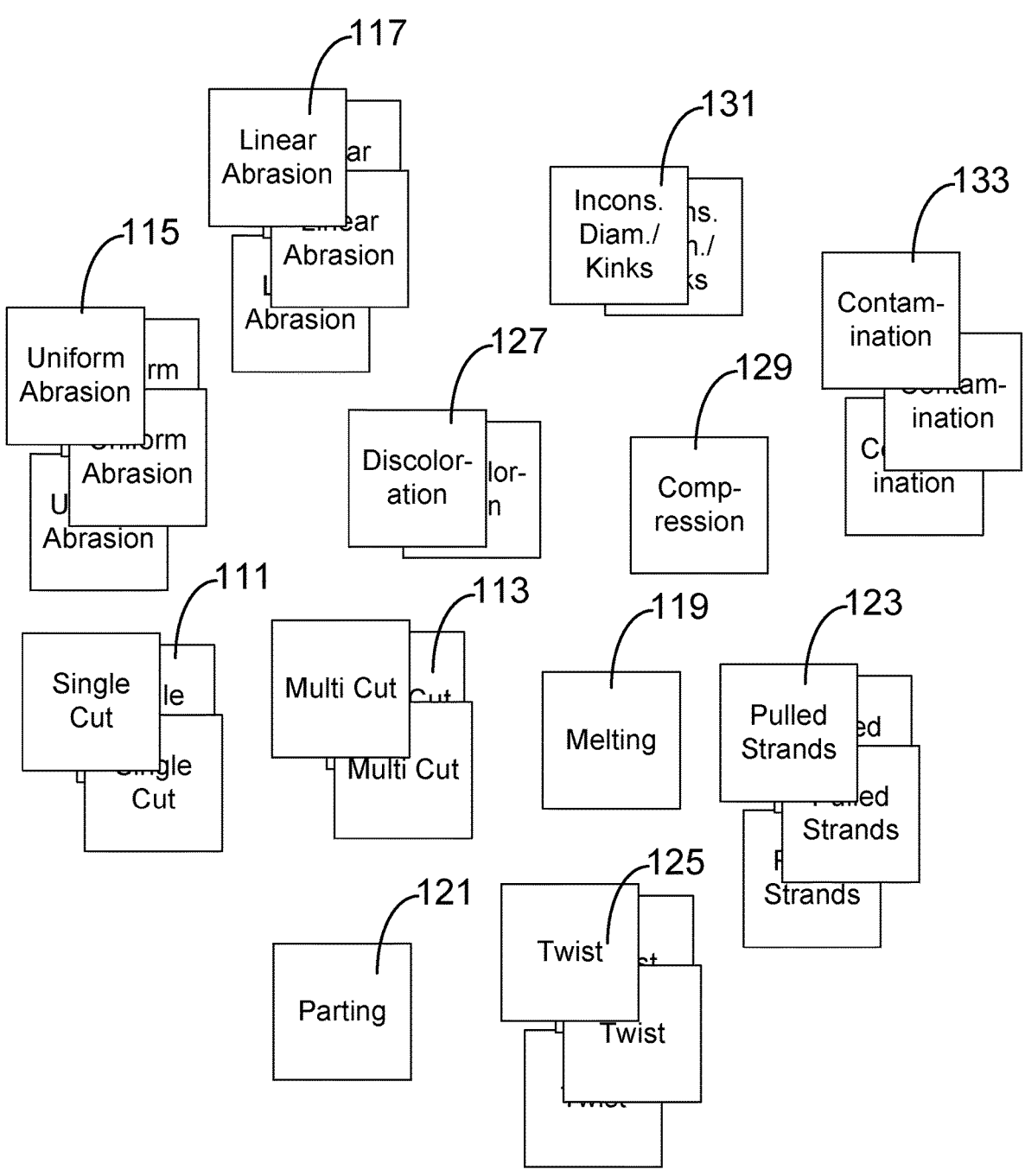
FIG. 7 is a schematic diagram showing example image feature clusters in accordance with an embodiment of the disclosed principles.

FIG. 7 is a schematic diagram showing example multi-dimensional visual feature clusters in accordance with an embodiment of the disclosed principles. The illustrated clusters include a single cut cluster 111, a multi-cut cluster 113, a uniform abrasion cluster 115, a linear abrasion cluster 117, a melting cluster 119, a parting cluster 121, a pulled strands cluster 123, a twisting cluster 125, discoloration cluster 127, compression cluster 129, inconsistent diameter/kinks cluster 131 and a contamination cluster 133.

Figure 8:
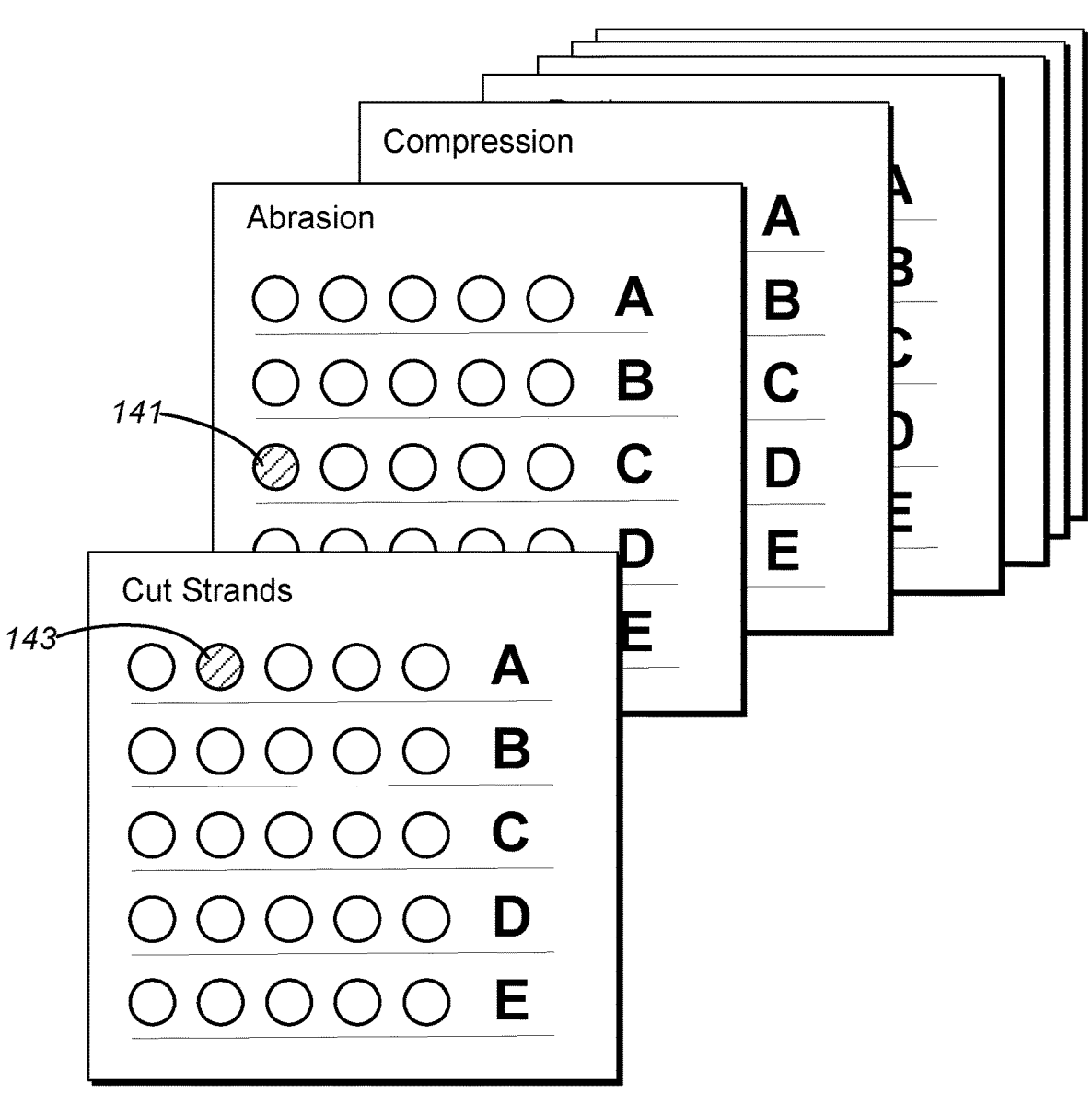
FIG. 8 is a schematic diagram showing an example of grading captured data in multiple cluster categories in accordance with an embodiment of the disclosed principles.

FIG. 8 is a schematic diagram showing an example of grading the captured data in multiple cluster categories in accordance with an embodiment of the disclosed principles. In the illustrated example, the data of interest shows a moderate amount of abrasion (level 141) and a low level of cut strands (level 143). With respect to calculating RBS, it should be appreciated that a very poor grade of a rope in any single feature cluster may be sufficient to predict a RBS that is less than a required threshold value to continue in service. For example, a high number of cut strands may be enough to put the RBS at 10% or lower.

Figure 9:
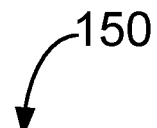
FIG. 9 is a schematic view of a product and damage mode specific visual index in accordance with an embodiment of the disclosed principles.
Figure 10:
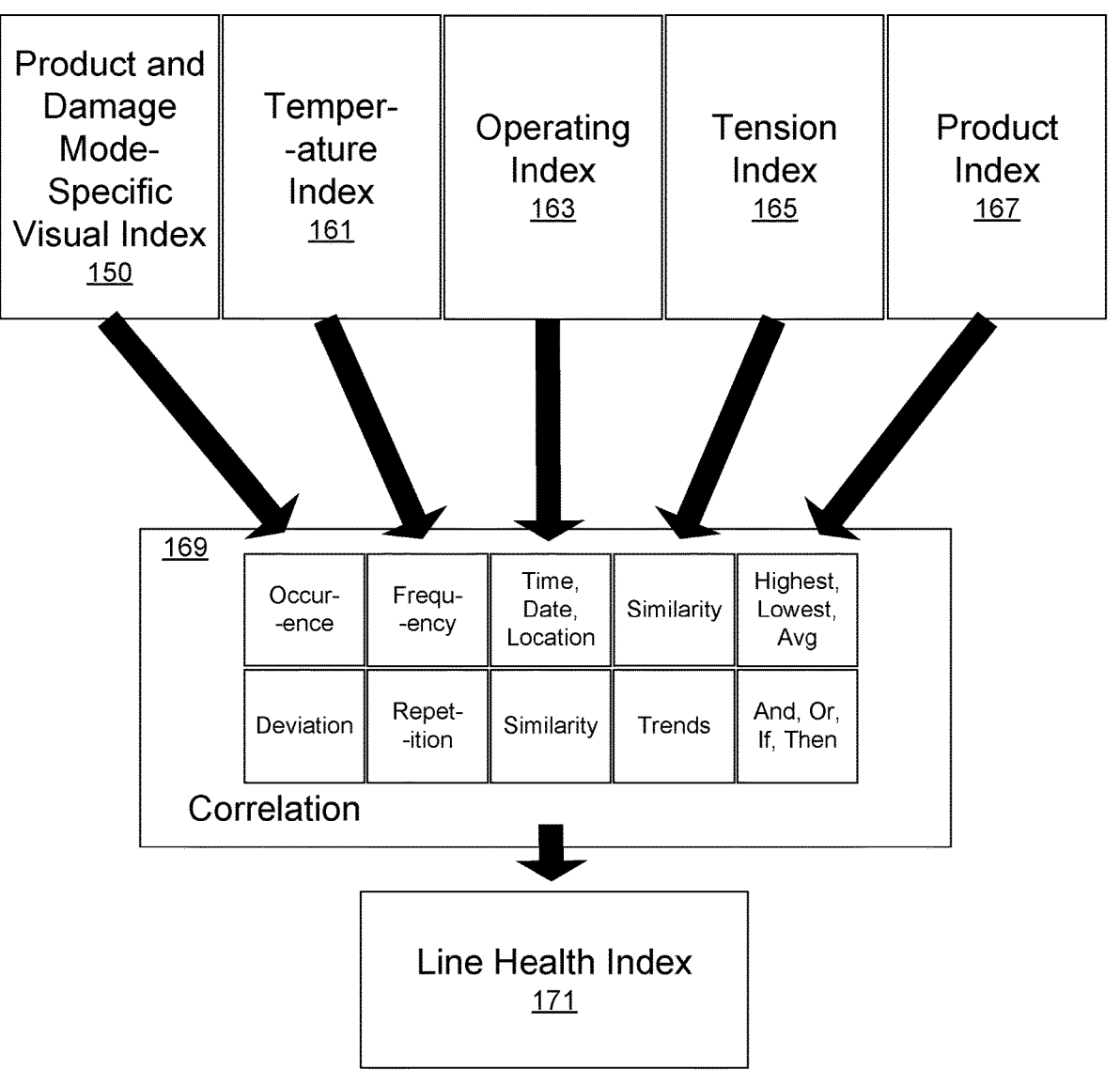
FIG. 10 is a flow chart of a process of combining the visual index with other factors via correlation to generate a line health index in accordance with an embodiment of the disclosed principles.

Turning now to FIG. 9, this figure shows a product and damage mode specific visual index in accordance with an embodiment of the disclosed principles. The visual index includes a grade relative to each feature cluster, e.g., the feature clusters shown in FIG. 7. In the illustrated index 150, each feature T, D, L, I, U and C is assigned a value by the system via recognizing quantitative representations of features and associating them with visual indices that share commonalities across the various sets of features within them. In this example, the following FIG. 10 shows a process of combining the visual index 150 with other factors via correlation to generate a line health index 171 in accordance with an embodiment of the disclosed principles. The other factors in the illustrated embodiment include a temperature index 161, an operating index 163, a tension index 165 and a product index 167. These indices are correlated (module 169) to produce the line health index 171.

Figure 11:
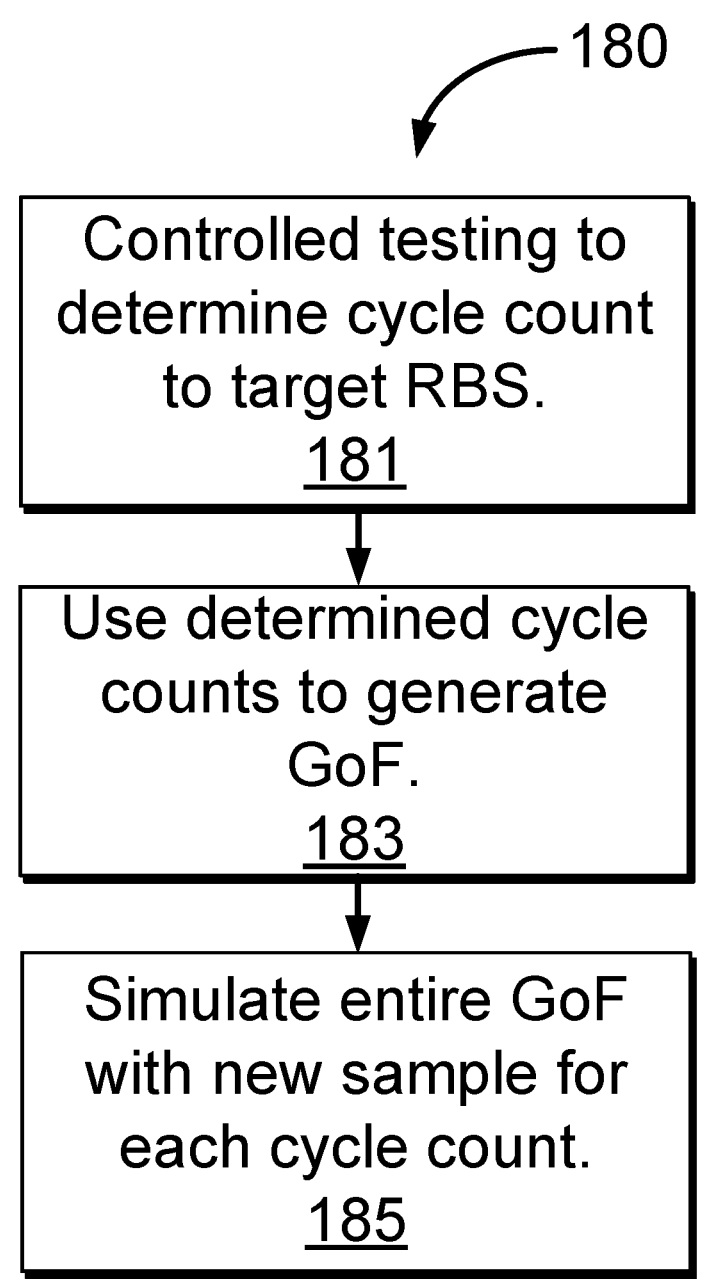
FIG. 11 is a flow chart of a process for damage mode simulation in accordance with an embodiment of the disclosed principles.

FIG. 11 et seq. show steps taken in training the system in accordance with an embodiment of the disclosed principles. Turning to FIG. 11, this figure shows a process 180 of damage mode simulation in accordance with an embodiment of the disclosed principles. At stage 181, controlled testing is executed to determine a cycle count to reach a target RBS consistently. The determined cycle counts are then used at stage 183 to generate a Gradient of Failure (GoF). Finally, at stage 185, the entire GoF is simulated with a new sample for each cycle count for verification.

Figure 12:
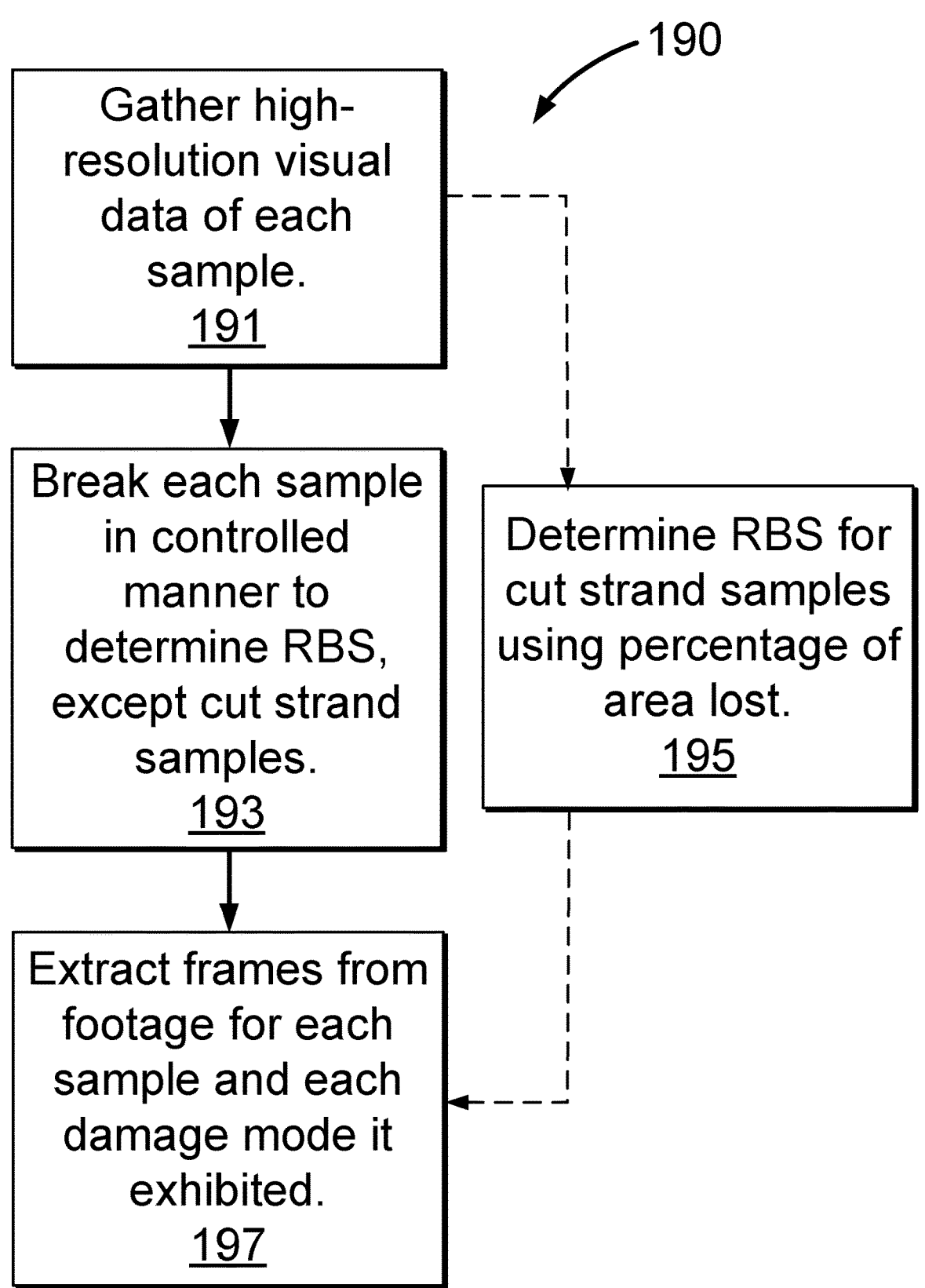
FIG. 12 is a flow chart of a process for generating key frames in accordance with an embodiment of the disclosed principles.

Turning now to FIG. 12, this figure shows a process of generating key frames in accordance with an embodiment of the disclosed principles based on the GoF failure and field used rope samples. At stage 191 of process 190, high-resolution visual data of each used rope sample is taken, and at stage 193, each sample is broken in a controlled manner to determine its RBS. For samples with one or more cut strands, the RBS of these samples is determined at stage 195 by determining the amount of cross-sectional area lost due to cut strands.

At stage 197, key frames are extracted from the relevant data for each sample and each damage mode it exhibited. These frames may be edited for clarity. Finally at stage 199, the process performs data labeling and classification via determined RBS, specific to product type and damage mode. The RBSs may be converted to mathematical scoring for indicators at this stage as well.

Following the generation of key frames, relevant features are detected and extracted from each frame via the multi-layered neural network in accordance with an embodiment of the disclosed principles. Thousands of features may be recognized and extracted from each break location frame in this manner. These feature sets are then clustered in the same manner discussed above with respect to real-time analysis of a rope under study, e.g., into clusters such as a single cut cluster, multi-cut cluster, uniform abrasion cluster, linear abrasion cluster, melting cluster, parting cluster, pulled strands cluster, twisting cluster, discoloration cluster, compression cluster, inconsistent diameter/kinks cluster and contamination cluster.

Visual indices are generated by compiling multi-dimensional quantitative representations of these features into an index specific to each inspection image, and these visual indices are then aggregated into visual directories in much the same way as discussed with respect to FIG. 8 (although in the context of real-time scanning). Directories, indices, cluster sets and features are then aggregated and containerized to store learned data for later use in real time scanning.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "such that," and "operable to" do not imply any particular tangible or intangible modification of a subject, but, rather, are intended to be used interchangeably. A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology.

A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The words "exemplary," "exemplify," and "example" are used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination.

It will be appreciated that various systems and processes have been disclosed herein. However, in view of the many possible embodiments to which the principles of the present disclosure may be applied, it should be recognized that the embodiments described herein with are meant to be illustrative only and should not be taken as limiting the scope of the claims. Therefore, the techniques as described herein contemplate all such embodiments as may come within the scope of the following claims and equivalents thereof.

We claim:

1. A method of analyzing a rope to estimate its residual break strength (RBS), the method comprising:
   training a multi-layered neural network to recognize rope damage and estimate an RBS for the rope under study, wherein training the multi-layered neural network to recognize rope damage and correlate it to an RBS comprises:
      collecting high-resolution visual data of a plurality of sample ropes, each sample rope having a known rated RBS and each having experienced an amount of a predetermined type of damage activity;
      extracting visual features of damaged areas of each rope;
      resolving each visual feature into a damage type and clustering damage type exemplars;
      breaking each sample rope to determine an actual RBS for each rope; and
      classifying the visual data via determined RBS, specific to product type and damage mode;
   receiving job and product data related to the rope under study;
   paying out a studied length of the rope under study;
   spooling back the paid out length of the rope under study while capturing high-resolution visual data and sensor data of the rope as it spools; and providing the captured data to the trained multi-layered neural network to generate an estimate of RBS for the rope under study.

2. The method of analyzing a rope in accordance with claim 1, wherein collecting high-resolution visual data of the plurality of sample ropes comprises collecting video data of the plurality of sample ropes.

3. The method of analyzing a rope in accordance with claim 2, wherein extracting visual features of damaged areas of each rope comprises extracting still image data from the high resolution visual data.

4. The method of analyzing a rope in accordance with claim 1, wherein resolving each visual feature into a damage type comprises identifying a primary damage type at the rope location for each visual feature.

5. The method of analyzing a rope in accordance with claim 1, wherein receiving job and product data related to the rope under study comprises receiving structural data regarding the rope under study.

6. The method of analyzing a rope in accordance with claim 1, wherein receiving job and product data related to the rope under study comprises receiving configuration data regarding the rope under study.

7. A system of analyzing a rope to estimate its residual break strength (RBS), the system comprising:
   a data intake system comprising one or more high-resolution visual data collectors to collect high-resolution visual data regarding the rope and a job and product data portal for receiving job and product data regarding the rope; and
   a data analysis system comprising a computer executing computer-executable instructions from a computer-readable medium configured to receive job and product data related to the rope, cause a length of the rope to be paid out, cause the paid out length to be spooled back in while capturing high-resolution visual data and sensor data of the rope as it spools and provide the captured data to a trained multi-layered neural network to generate an estimate of RBS for the rope.

8. The system of analyzing a rope in accordance with claim 7, further comprising collecting high-resolution visual data of a plurality of sample ropes.

9. The system of analyzing a rope in accordance with claim 8, further comprising extracting visual features of damaged areas of the plurality of sample ropes.

10. The system of analyzing a rope in accordance with claim 9, further comprising resolving each visual feature into a damage type.

11. The system of analyzing a rope in accordance with claim 7, wherein the job and product data comprises structural data for the rope.

12. The system of analyzing a rope in accordance with claim 7, wherein the job and product data comprises configuration data for the rope.

* * * * *